United States Patent [19]

Kageyama et al.

[11] 4,026,878

[45] May 31, 1977

[54] VULCANIZATION ACCELERATOR SYSTEM FOR RUBBER COMPOSITIONS

[75] Inventors: Kunio Kageyama, Yokohama; Hiroshi Hirakawa; Masatake Ozaki, both of Isehara; Iwao Sugiyama, Hiratsuka; Mitsuharu Iwakura, Hiratsuka; Yoshiaki Someya, Hiratsuka, all of Japan

[73] Assignee: The Yokohama Rubber Co. Ltd., Tokyo, Japan

[22] Filed: Oct. 24, 1975

[21] Appl. No.: 625,569

[30] Foreign Application Priority Data

Oct. 25, 1974 Japan ........................... 49-122602

[52] U.S. Cl. .......................... 260/79.5 P; 252/182; 260/79.5 A; 260/79.5 B; 260/783; 260/793

[51] Int. Cl.² ...................... C08L 7/00; C08L 9/00; C09K 3/00

[58] Field of Search ............... 252/182; 260/79.5 P, 260/79.5 A, 79.5 B, 783, 793

[56] References Cited

UNITED STATES PATENTS

| | | | |
|---|---|---|---|
| 1,440,962 | 1/1923 | Cadwell | 260/783 |
| 1,652,101 | 12/1927 | Elley | 260/784 |
| 2,955,102 | 10/1960 | Clayton et al. | 260/792 |
| 3,023,195 | 2/1962 | Martin et al. | 260/793 |
| 3,197,446 | 7/1965 | Ziarnik et al. | 260/793 |
| 3,531,444 | 9/1970 | Behrens | 260/793 |
| 3,869,435 | 3/1975 | Trivette | 260/79.5 P |
| 3,876,590 | 4/1975 | Shimogawa et al. | 260/793 |
| 3,910,864 | 10/1975 | Son | 260/79.5 A |

*Primary Examiner*—Ronald W. Griffin
*Attorney, Agent, or Firm*—Finnegan, Henderson, Farabow & Garrett

[57] ABSTRACT

Rubber compositions containing therein as a source of carbon disulfide a compound selected from the group consisting of cyclic bis (dithiocarbamic acid) metal salts and cyclic or non-cyclic dithiocarbamic-xanthogenic acid metal salts and an amine-isocyanate addition compound as a vulcanization accelerator system having excellent scorching stability with rapid vulcanization at usual vulcanization temperatures.

25 Claims, 1 Drawing Figure

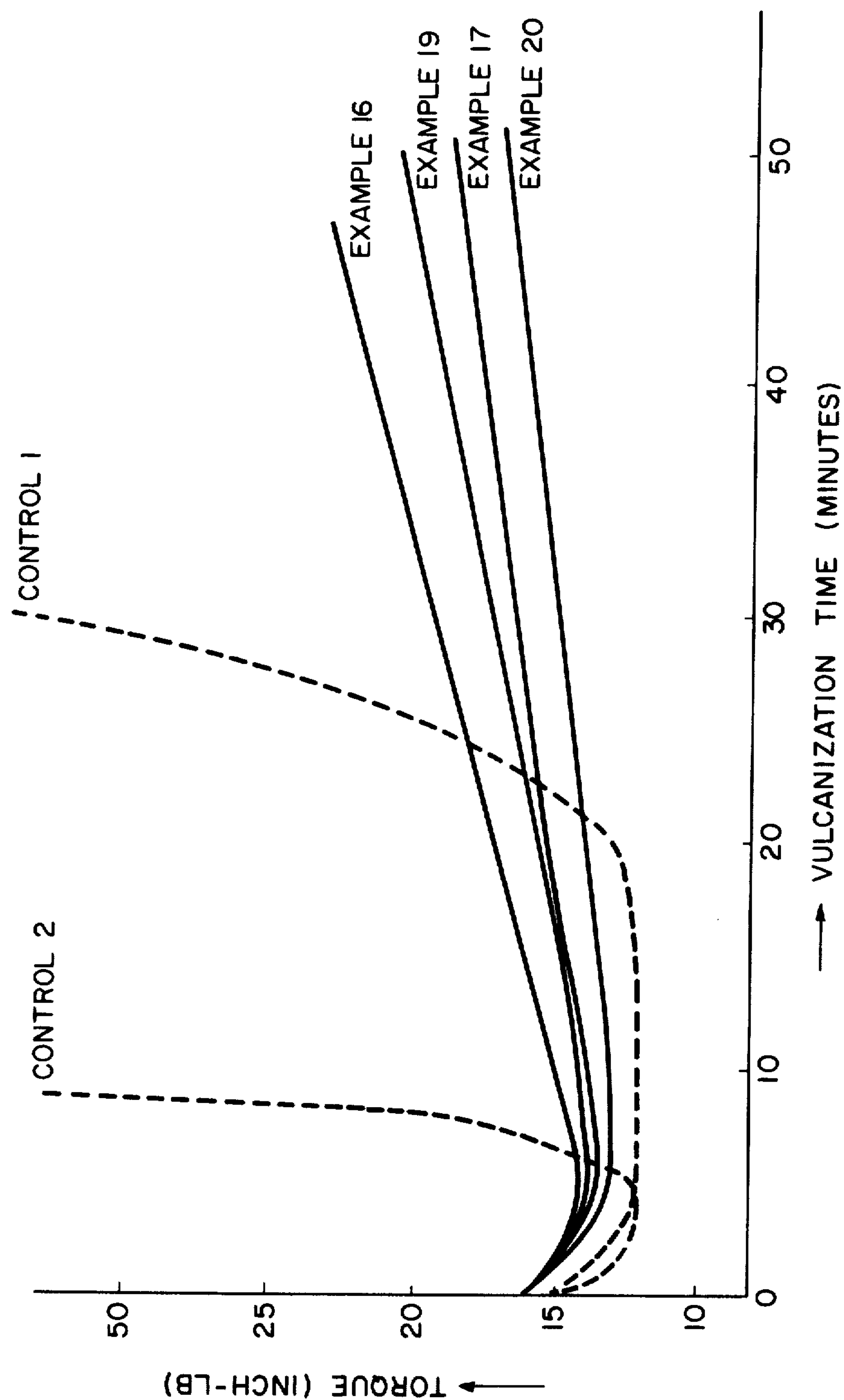
CONTROL 2
CONTROL 1
EXAMPLE 16
EXAMPLE 19
EXAMPLE 17
EXAMPLE 20
→ VULCANIZATION TIME (MINUTES)
0
10
20
30
40
50
→ TORQUE (INCH-LB)
10
15
20
25
50

VULCANIZATION ACCELERATOR SYSTEM FOR RUBBER COMPOSITIONS

This invention relates to a vulcanization accelerator system for rubber compositions and more especially to a vulcanization accelerator produced chemically in the rubber composition.

There are many established techniques for adding vulcanization accelerators to rubber to shorten the vulcanization time, to lower the vulcanization temperature, to improve various characteristics of the vulcanized rubber articles, and to improve the handling ability of the rubber during processing in vulcanization apparatus.

Vulcanization accelerators presently used in the industry, however, present many different problems. For example, dithioacid salts such as dithiocarbamates or thiurams, so called "ultra-accelerators", rapidly accelerate vulcanization at conventional vulcanization temperatures, but they have the problem of prematurely vulcanizing the rubber compositions during processing steps, such as mixing or molding, due to the heat generated by their own activity resulting in undesired scorching of the rubber. Sulfenamides, so called "delayed action accelerators", do not present scorching problems, but they tend to retard the rate of vulcanization.

In other words, known accelerators generally have scorching characteristics directly proportional to their rate of vulcanization.

Accordingly, it has become important in the rubber industry to find novel accelerator systems that prevent scorching of the rubber at processing temperatures but that allow vulcanization to take place rapidly at vulcanization temperatures.

There are methods in which the accelerator is stabilized and prevented from being released below some limited temperature in an attempt to satisfy these requirements for rubber vulcanization accelerator systems. In U.S. Pat. No. 1,511,984, for example, there is disclosed a method in which rubber is mixed with activated carbon adsorbed accelerator on the surface. Also, there is known an accelerator system in which rubber is mixed with barium trithiocarbonate which decomposes during heating to isolate carbon disulfide, and some kind of an amine together with sulfur, zinc oxide and other ingredients. Dithiocarbamic acid is then produced by heating to carry out the vulcanization.

These accelerator systems, however, tend to release accelerator or some active component even at the temperatures used during processing or rubber and, as a result, their scorching characteristics have not been significanty improved.

More recently, a method has been proposed (Japanese P. Tokkai Sho 47-42850) in which polythiocarbonate, which releases carbon disulfide during heating, and an amine or imine blocked with isocyanate, which releases amine or imine during heating, are mixed in the rubber composition so as to produce dithiocarbamic acid at the vulcanization temperature. However, polythiocarbonate used in this system has a decomposition temperature only slightly higher than the temperature used in the processing step and, consequently, its thermal stability is not good and vulcanization tends to gradually take place during the processing step.

An object of the present invention, therefore, is to overcome the problems created by these conventional techniques.

A further object of this invention is to provide a vulcanization accelerator system in which scorching does not take place for a long period of time at the temperatures encountered during processing of the rubber but that achieves rapid vulcanization at vulcanization temperatures.

These objects are achieved by the present invention by providing a rubber composition containing an "in situ" vulcanization accelerator system comprising essentially two components. One of them is a compound that does not decompose for a long period of time at the processing temperature of rubber and yet rapidly decomposes at the vulcanization temperature to isolate carbon disulfide (hereinafter called "carbon disulfide source"), and the other is an amine or imine blocked with isocyanate or an amine-isocyanate addition compound (hereinafter called "amine source").

By adding them together with other components such as sulfur and zinc oxide into vulcanizable rubber, it has been found that the problems of scorching do not take place for a long period of time during the processing step and that vulcanization at the vulcanization temperature takes place rapidly. Further the general overall processing ability of the rubber composition is vastly improved.

The drawing shows vulcanization curves of the rubber compositions described in Examples 1 and 4.

In accordance with the present invention, the carbon disulfide source is a compound selected from the group consisting of cyclic bis (dithiocarbamic acid) metal salts and cyclic or non-cyclic dithiocarbamic-xanthogenic acid metal salts.

Cyclic bis (dithiocarbamic acid) salts suitable for use in this invention have the following general formula:

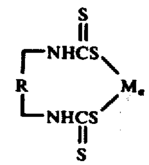

in which $M_a$ represents di-valent metal atom and R represents a di-valent cycloaliphatic or aromatic radical.

The compounds may be produced by reacting a diamine, carbon disulfide, alkali-metal hydroxide and metal halide. As cycloaliphatic diamines, there may be used: 1,2-cyclohexane diamine; as aromatic diamines, o-phenylene diamine, m-phenylene diamine, 2.4-tolylene diamine, 2.3-tolylene diamine, o-xylylene diamine, m-xylylene diamine, 2.3-diaminophenol or 2.3-naphthylene diamine. As metal halides ($M_xX_2$), in which $M_a$ can be Zn, Cu, Fe, Ni, Co, Mn, or the like and X is I, Br or Cl. $M_aCl_2$ is preferably used.

Preferred cyclic bis (dithiocarbamic acid) metal salts include zinc, ferrous, nickel, cobalt and manganese phenylene-1,2-bis-dithiocarbamate, zinc cyclohexyl-1,2-bis-dithiocarbamate, zinc phenylene-1,3-bis-dithiocarbamate, zinc 1,2-xylylene-bis-dithiocarbamate, zinc hydroxyphenyl-3,4-bis-dithiocarbamate, zinc tolylene-3,4-bis-dithiocarbamate, zinc naphthylene-1,2-bis-dithiocarbamate and zinc tolylene-2,4-bis-dithiocarbamate.

Dithiocarbamic-xanthogenic acid salts suitable for use in this invention include non-cyclic salts of monovalent metal atoms having the formula I and cyclic salts of di and tri-valent metal atoms having the formulas II and III:

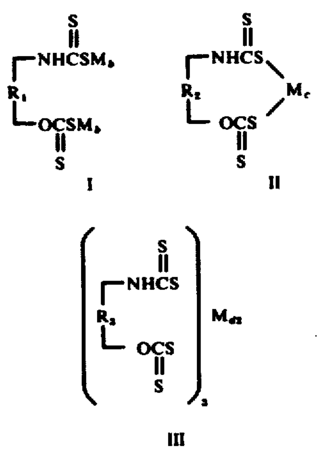

in which $R_1$, $R_2$, $R_3$ represent di-valent aliphatic radicals and more preferably, substituted or unsubstituted chain type alkylene radicals; $M_b$ represents a mono-valent metal atom; $M_c$ represents a di-valent metal atom and $M_d$ represents a tri-valent metal atom.

Some typical examples of these compounds are as follows:

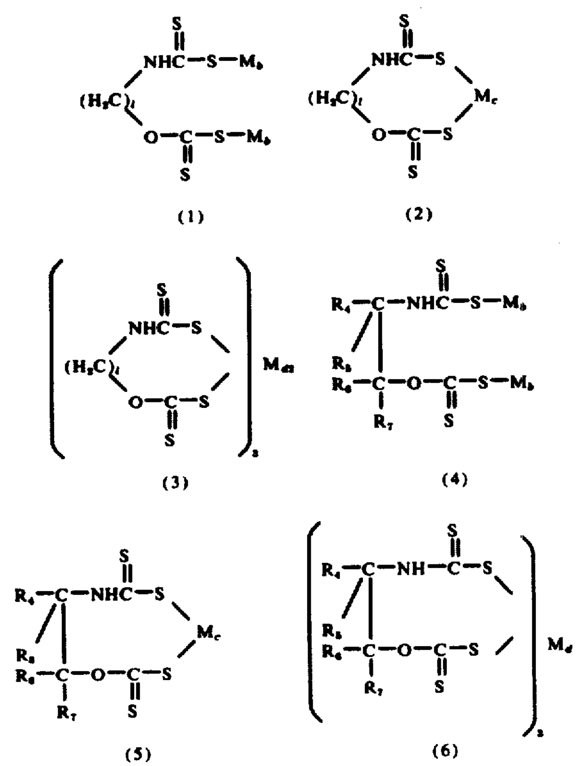

In the above formulas, $l$ is an integer of from 2 to 5, and when $R_4$ is hydrogen, $R_5$ is hydrogen, methyl, ethyl or propyl, $R_6$ is hydrogen, methyl, ethyl or propyl and $R_7$ is hydrogen, methyl, ethyl or propyl. When $R_4$ is methyl, $R_5$ is methyl, ethyl or propyl, $R_6$ is hydrogen, methyl, ethyl or propyl and $R_7$ is hydrogen, methyl, ethyl or propyl. When $R_4$ is ethyl, $R_5$ is ethyl or propyl, $R_6$ is hydrogen, methyl, ethyl or propyl and $R_7$ is methyl, ethyl or propyl.

As metal atoms, $M_b$ is preferably selected from Li, Ka, Na, Ag and Cu. $M_c$ is preferably selected from Ca, Mg, Co, Mn, Fe, Ni, Zn, Cu, Sb and Bi. $M_d$ is preferably selected from Al, Fe and Cr. These carbon disulfide sources can be readily produced by reacting an alkanol amine, alkali metal hydroxide, carbon disulfide and metal halide. As alkanol amines there may be used monoethanolamine, 1-aminopropane-3-ol, 1-aminobutane-4-ol, 1-aminopentane-5-ol, 1-aminopropane-2-ol, 2-aminopropane-1-ol, 1-aminobutane-2-ol, 2-aminobutane-2-ol, 1-amino-2-methylpropane-2-ol and 2-aminobutane-3-ol.

Preferred cyclic and non-cyclic dithiocarbamic-xanthogenic acid metal salts include zinc, nickel, ferric, manganese, aluminum, barium and silver ethylene-1-dithiocarbamate-2-xanthogenate.

The other component of this invention, the amine source, is an amine including an imine blocked with isocyanate or an addition compound of a secondary amine and isocyanate produced by the following reaction:

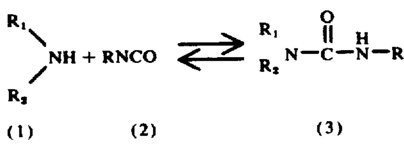

which $R_1$ and $R_2$ are the same or different mono-valent hydrocabon radical containing 1 to 8 carbon atoms, or together with the nitrogen atom and optionally with one or more additional heteroatoms selected from oxygen, sulphur and nitrogen represent a non-acidic heterocyclic ring, including a fused ring.

Examples of such amines are dimethylamine, diethylamine, di-n-propylamine, di-isopropylamine, di-n-butylamine, di-sec-butylamine, di-tert-butylamine, di-2-ethyl-hexylamine, N-methyl-N-cyclohexylamine, dicyclohexylamine, diphenylamine, di-tolylamine, pyridone, piperidine, piperazine, pyrrole, pyrazole, imidazole, morphorine, pyrrolidine, etc. In the isocyanate R is an aryl or alkyl radical having 4 to 18 carbon atoms. The aryl or alkyl radical can additionally contain an isocyanate radical or other substituent.

Examples of such isocyanates are phenyl isocyanate, p-chlorophenyl isocyanate, hexamethylene diisocyanate, octadecyl isocyanate 2,4- and 2,6-toluene diisocyanate, di-phenylmethane-p,p'-diisocyanate, p-phenylene diisocyanate, di-chlorodiphenylmethane diisocyanate and naphthalene-1,5-diisocyanate.

The method for producing the amine blocked with isocyanate is easily carried out. The isocyanate and amine are dissolved in suitable solvents respectively, and mixed to produce the product. The reaction of producing this addition compound is exothermic, so a reactor equipped with a cooler is preferably used.

In the production of the amine-isocyanate addition compound, the amine releasing temperature is widely changeable by selection of the particular amine and isocyanate to be used.

The amine is stabilized in form (3) at the temperatures encountered in the processing step, but at vulcanization temperatures free amine is isolated which reacts with the carbon disulfide source to produce, in situ, a dithiocarbamic acid type accelerator so that vulcanization of the rubber will proceed rapidly.

The amount of the carbon disulfide source and the amine source used is adjusted to provide a molar ratio of from 0.5 to 2, and more preferably 1 mole or isolated amine to 1 mole of carbon disulfide. The amount of the carbon disulfide source added to the rubber is preferably from about 0.1 to 8 parts, and more preferably from 0.5 to 2 parts by weight per 100 parts or rubber During mixing of the carbon disulfide source and the amine source into the rubber, zinc oxide, stearic acid, sulfur, fillers or other components usually used in rubber composition can be mixed in simultaneously.

Rubber to be used in the vulcanization system of this invention is rubber which is vulcanizable by a sulfur accelerator system; in other words, rubber containing an olefinically unsaturated group, such as natural rubber, polyisoprene rubber, polybutadiene rubber, styrene-butadiene copolymer rubber, acrylonitrile-butadiene copolymer rubber, ethylene-propylene-diene terpolymer rubber, and the like.

The invention will now be explained by reference to the following Examples, but without any intention to be limited thereby.

EXAMPLES 1–15

Rubber compositions containing accelerator systems of the present invention are prepared, as taught above, by mixing in the usual manner the ingredients shown in Table I. Control rubber samples (controls 1–5) are also prepared for comparison purposes.

TABLE I

| Components | Control 1 | Control 2 | Control 3 | Control 4 | Control 5 | Example 1 | Example 2 | Example 3 | Example 4 | Example 5 | Example 6 | Example 7 |
|---|---|---|---|---|---|---|---|---|---|---|---|---|
| Natural rubber | 100 | 100 | 100 | 100 | 100 | 100 | 100 | 100 | 100 | 100 | 100 | 100 |
| Styrene-butadiene copolymer (SBR-1712) | — | — | — | — | — | — | — | — | — | — | — | — |
| HAF carbon black | 50 | 50 | 50 | 50 | 50 | 50 | 50 | 50 | 50 | 50 | 50 | 50 |
| Zinc oxide | 5 | 5 | 5 | 5 | 5 | 5 | 5 | 5 | 5 | 5 | 5 | 5 |
| Stearic acid | 3 | 3 | 3 | 3 | 3 | 3 | 3 | 3 | 3 | 3 | 3 | 3 |
| Desolex [4] | 10 | 10 | 10 | 10 | 10 | 10 | 10 | 10 | 10 | 10 | 10 | 10 |
| Sulfur | 2 | 2 | 2 | 2 | 2 | 2 | 2 | 2 | 2 | 2 | 2 | 2 |
| N-cyclohexyl-2-benzothiazole sulfenamide | 0.8 | | | | | | | | | | | |
| Tetramethylthiuram disulfide | | 0.4 | | | | | | | | | | |
| Cyclicbis (dithiocarbamic acid) salts as carbon disulfide source: | | | | | | | | | | | | |
| zinc phenylene-1,2-bis-dithiocarbamate (1) | | | | 1.1 | 1.1 | 1.1 | | | | | | |
| ferrous phenylene-1,2-bis-dithiocarbamate (2) | | | | | | | 1.1 | | | | | |
| nickel phenylene-1,2-bis-dithiocarbamate (3) | | | | | | | | 1.1 | | | | |
| cobalt phenylene-1,2-bis-dithiocarbamate (4) | | | | | | | | | 1.1 | | | |
| manganese phenylene-1,2-bis-dithiocarbamate (5) | | | | | | | | | | 1.1 | | |
| zinc cyclohexyl-1,2-bis-dithiocarbamate (6) | | | | | | | | | | | 1.1 | |
| zinc phenylene-1,3-bis-dithiocarbamate (7) | | | | | | | | | | | | 1.1 |
| zinc 1,2-xylylene-bis-dithiocarbamate (8) | | | | | | | | | | | | |
| zinc hydroxyphenyl-3,4-bis-dithiocarbamate (9) | | | | | | | | | | | | |
| zinc tolylene-3,4-bis-dithiocarbamate (10) | | | | | | | | | | | | |
| zinc naphthylene-1,2-bis-dithiocarbamate (11) | | | | | | | | | | | | |
| zinc tolylene-2,4-bis-dithiocarbamate (12) | | | | | | | | | | | | |
| Polythiocarbonate | | | 1.0 | | | | | | | | | |
| Pyrrolidine/4.4'-diphenylmethane diisocyanate | — | — | 1.2 | — | — | 1.2 | 1.2 | 1.2 | 1.2 | 1.2 | 1.2 | 1.2 |

| Components | Example 8 | Example 9 | Example 10 | Example 11 | Example 12 | Example 13 | Example 14 | Example 15 |
|---|---|---|---|---|---|---|---|---|
| Natural rubber | 100 | 100 | 100 | 100 | 100 | — | — | — |
| Styrene-butadiene copolymer (SBR-1712) | — | — | — | — | — | 137.5 | 137.5 | 137.5 |
| HAF carbon black | 50 | 50 | 50 | 50 | 50 | 70 | 70 | 70 |
| Zinc oxide | 5 | 5 | 5 | 5 | 5 | 3 | 3 | 3 |
| Stearic acid | 3 | 3 | 3 | 3 | 3 | 2 | 2 | 2 |
| Desolex [4] | 10 | 10 | 10 | 10 | 10 | 8 | 8 | 8 |
| Sulfur | 2 | 2 | 2 | 2 | 2 | 2 | 2 | 2 |
| N-cyclohexyl-2-benzothiazole sulfenamide | | | | | | | | |
| Tetramethylthiuram disulfide | | | | | | | | |
| Cyclicbis (dithiocarbamic acid) salts as carbon disulfide source: | | | | | | | | |
| zinc phenylene-1,2-bis-dithiocarbamate (1) | | | | | | 1.1 | | |
| ferrous phenylene-1,2-bis-dithiocarbamate (2) | | | | | | | | |
| nickel phenylene-1,2-bis-dithiocarbamate (3) | | | | | | | | |
| cobalt phenylene-1,2-bis-dithiocarbamate (4) | | | | | | | | |
| manganese phenylene-1,2-bis-dithiocarbamate (5) | | | | | | | | |
| zinc cyclohexyl-1,2-bis-dithiocarbamate (6) | | | | | | | | |
| zinc phenylene-1,3-bis-dithiocarbamate (7) | | | | | | | | 1.1 |
| zinc 1,2-xylylene-bis-dithiocarbamate (8) | 1.2 | | | | | | 1.1 | |
| zinc hydroxyphenyl-3,4-bis-dithiocarbamate (9) | | 1.2 | | | | | | |
| zinc tolylene-3,4-bis-dithiocarbamate (10) | | | 1.2 | | | | | |
| zinc naphthylene-1,2-bis-dithiocarbamate (11) | | | | 1.3 | | | | |
| zinc tolylene-2,4-bis-dithiocarbamate (12) | | | | | 1.2 | | | |
| Polythiocarbonate | | | | | | | | |
| Pyrrolidine/4.4'-diphenylmethane diisocyanate | 1.2 | 1.2 | 1.2 | 1.2 | 1.2 | 1.2 | 1.2 | 1.2 |

[4] Aromatic type oil manufactured by Showa Oil Company, Ltd.

Cyclic bis (dithiocarbamic acid) salts of Table I

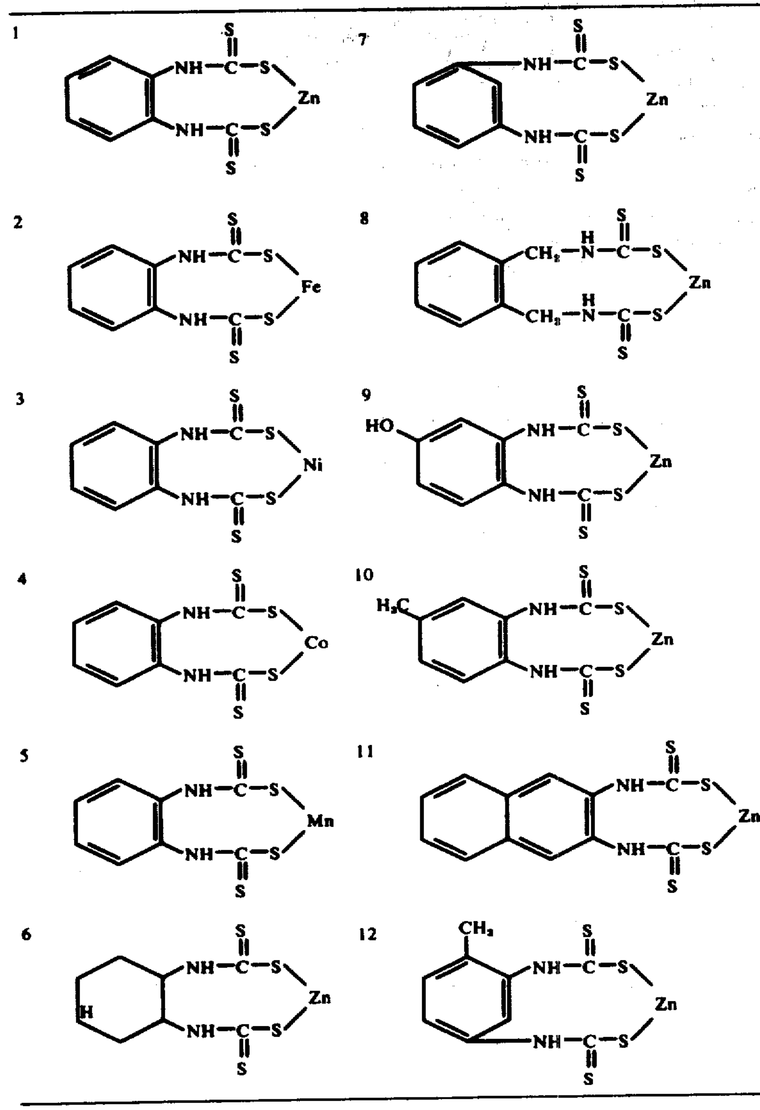

Vulcanization of the compositions is then carried out and the vulcanization characteristics of the rubber are measured by using an MPV type Rheometer manufactured by The Monsanto Company. The results are shown in Table II below.

In Table II, Tc represents optimum vulcanization time in minutes or time taken to reach 95% of maximum torque and Ts represents scorch time or time taken to reach torque of just 3 inch-pounds higher than minimum torque.

TABLE II

| Testing Temperature | 125° C | 150° C | | 160° C | |
|---|---|---|---|---|---|
| Characteristic | Ts | Tc | Ts | Tc | Ts |
| | 28.3 | 29.5 | 3.2 | 14.4 | 1.7 |
| 2 | 27.4 | 27.6 | 3.1 | 12.8 | 1.6 |
| 3 | 44.5 | 30.7 | 4.1 | 14.4 | 2.1 |
| 4 | 36.7 | 31.2 | 3.7 | 16.3 | 2.2 |
| 5 | 40.0 | 32.2 | 4.0 | 14.8 | 2.3 |
| 6 | 38.0 | 30.1 | 4.0 | 15.7 | 2.1 |
| 7 | 33.7 | 31.5 | 4.0 | 14.3 | 2.0 |
| 8 | 48.5 | 28.3 | 5.6 | 12.3 | 2.5 |
| 9 | 45.6 | 29.6 | 4.0 | 13.4 | 2.2 |

TABLE II-continued

| Testing Temperature | 125° C | 150° C | | 160° C | |
|---|---|---|---|---|---|
| Characteristic | Ts | Tc | Ts | Tc | Ts |
| 10 | 36.4 | 27.7 | 3.8 | 14.7 | 1.8 |
| 11 | 33.2 | 30.3 | 3.6 | 17.2 | 1.9 |
| 12 | 37.7 | 29.5 | 4.2 | 13.3 | 2.0 |
| 13 | 72.0 | — | — | 40.1 | 9.5 |
| 14 | 70.1 | — | — | 39.2 | 8.2 |
| 15 | 69.3 | — | — | 37.1 | 7.5 |
| Control 1 | 24.1 | 13.2 | 4.7 | 7.4 | 2.0 |
| 2 | 7.6 | 48.0 | 1.8 | 2.7 | 0.8 |
| 3 | 36.0 | 15.7 | 2.8 | 7.9 | 1.9 |
| 4 | 50 | — | — | 25 | 2.3 |
| 5 | Testing was impossible | | | | |

EXAMPLES 16–24

Rubber compositions are prepared as shown in Table III and experiments are conducted in the same manner as set forth in Examples 1–15. Control rubber samples 1–3, 6 and 7 are also prepared for comparison purposes.

TABLE III

| Component | Control 1 | 2 | 3 | 6 | 7 | Example 16 | 17 | 18 | 19 | 20 | 21 | 22 | 23 | 24 |
|---|---|---|---|---|---|---|---|---|---|---|---|---|---|---|
| Natural rubber | 100 | 100 | 100 | 100 | 100 | 100 | 100 | 100 | 100 | 100 | 100 | 100 | — | — |
| Styrene-butadiene copolymer (SBR-1712) | — | — | — | — | — | — | — | — | — | — | — | — | 137.5 | 137.5 |
| HAF carbon black | 50 | 50 | 50 | 50 | 50 | 50 | 50 | 50 | 50 | 50 | 50 | 50 | 70 | 70 |
| Zinc oxide | 5 | 5 | 5 | 5 | 5 | 5 | 5 | 5 | 5 | 5 | 5 | 5 | 3 | 3 |
| Stearic acid | 3 | 3 | 3 | 3 | 3 | 3 | 3 | 3 | 3 | 3 | 3 | 3 | 2 | 2 |
| Desolex [(4)] | 10 | 10 | 10 | 10 | 10 | 10 | 10 | 10 | 10 | 10 | 10 | 10 | 8 | 8 |
| Sulfur | 2 | 2 | 2 | 2 | — | 2 | 2 | 2 | 2 | 2 | 2 | 2 | 2 | 2 |
| N-cyclohexyl-2-benzothiazole sulfenamide | 0.8 | 0.8 | 0.8 | 0.8 | | | | | | | | | | |
| Tetramethylthiuram disulfide | | 0.4 | | | | | | | | | | | | |
| Polythiocarbonate | | | 1.0 | | | | | | | | | | | |
| Cyclic and non-cyclic dithiocarbamic-xanthogenic acid metal salts as carbon disulfide source: | | | | | | | | | | | | | | |
| Zinc ethylene-1-dithiocarbamate-2-xanthogenate (1) | | | | 1.0 | 1.0 | 1.0 | | | | | | | 1.0 | |
| Aluminum ethylene-1-dithiocarbamate-2-xanthogenate (2) | | | | | | | 0.9 | | | | | | | |
| Nickel ethylene-1-dithiocarbamate-2-xanthogenate (3) | | | | | | | | 1.0 | | | | | | |
| Barium ethylene-1-dithiocarbamate-2-xanthogenate (4) | | | | | | | | | 1.3 | | | | | |
| Ferric ethylene-1-dithiocarbamate-2-xanthogenate (5) | | | | | | | | | | 1.0 | | | | 1.0 |
| Silver ethylene-1-dithiocarbamate-2-xanthogenate (6) | | | | | | | | | | | 1.0 | | | 1.8 |
| Manganese ethylene-1-dithiocarbamate-2-xanthogenate (7) | | | | | | | | | | | | 1.0 | | |
| Pyrrolidine/4.4'-diphenylmethane diisocyanate | | | 1.2 | — | — | 1.2 | 1.2 | 1.2 | 1.2 | 1.2 | 1.2 | 1.2 | 1.2 | 1.2 |

Carbon disulfide source of Table III

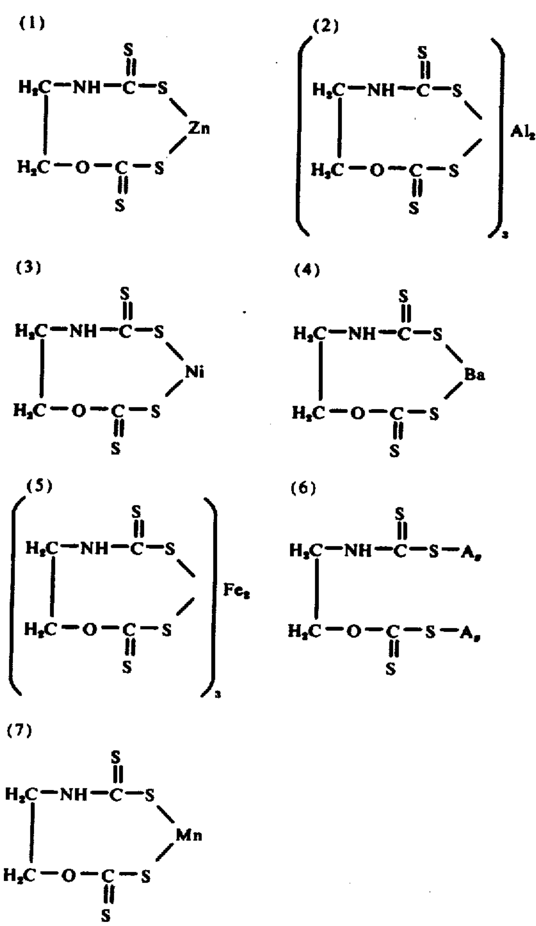

The results of the tests on the compositions of Examples 16–24 are shown below in Table IV; $T_c$ and $T_s$ being as explained in Examples 1–15. The vulcanization curves of the rubber compositions of Examples 16, 17, 19 and 20 and control samples 1 and 2 are shown in the drawing.

TABLE IV

| Testing Temperature | | 125° C | 150° C | | 160° C | |
|---|---|---|---|---|---|---|
| Characteristic | | Ts | Tc | Ts | Tc | Ts |
| Example | 16 | 19.5 | 37.5 | 3.0 | 16.0 | 1.4 |
| | 17 | 28.5 | 37.0 | 3.1 | 17.6 | 1.6 |
| | 18 | 47.5 | 38.3 | 3.4 | 19.2 | 1.8 |
| | 19 | 26.0 | 42.5 | 2.8 | 16.1 | 1.6 |
| | 20 | 41.5 | 36.5 | 3.5 | 16.2 | 1.6 |
| | 21 | 20.5 | 34.2 | 2.2 | 14.4 | 1.3 |
| | 22 | 38.2 | 40.5 | 3.6 | 20.5 | 2.1 |
| | 23 | 92.3 | 47.7 | 8.2 | 23.8 | 4.7 |
| | 24 | 101 | 51.5 | 10.4 | 26.3 | 6.6 |
| Control | 1 | 24.1 | 13.2 | 4.7 | 7.4 | 2.0 |
| | 2 | 7.6 | 4.8 | 1.8 | 2.7 | 0.8 |
| | 3 | 36.0 | 15.7 | 2.8 | 7.9 | 1.9 |
| | 6 | 65.5 | 50.3 | 10.1 | 25.5 | 4.5 |
| | 7 | beyond 120 min. | -Testing was impossible - | | | |

As is clear from the above description, the rubber compositions of this invention containing as a vulcanization accelerator, a carbon disulfide source selected from the group consisting of cyclic bis (dithiocarbamic acid) metal salts and cyclic or non-cyclic dithiocarbamic-xanthogenic acid metal salts, and an amine source consisting of an amine or imine blocked with isocyanate, are excellently inert to chemical reaction at usual processing temperatures (below about 125° C) and their scorch stability is quite excellent in comparison with presently known accelerators.

Moreover, when the rubber compositions are heated to vulcanization temperatures (above 160° C) to vulcanize them, they are rapidly vulcanized at the same or even better rate of vulcanization as known accelerators.

Accordingly, the problems in the rubber industry of preventing scorching during the processing step while achieving vulcanization rapidly and easily during the vulcanization step are substantially overcome by this invention.

What is claimed is:

1. A vulcanization accelerator system comprising:

A. at least one compound selected from the group consisting of:

1. cyclic bis (dithiocarbamic acid) metal salts having the formula:

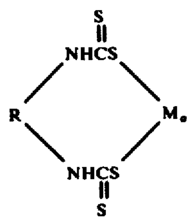

in which R represents a di-valent cycloaliphatic or aromatic radical and $M_a$ represents a di-valent metal atom, 2. non-cyclic dithiocarbamic-xanthogenic acid metal salts having the formula:

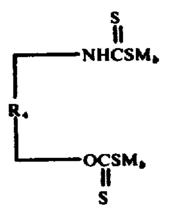

wherein $M_b$ is a mono-valent metal atom and $R_4$ is a di-valent aliphatic radical, and 3. cyclic dithiocarbamic-xanthogenic acid metal salts having the formulas:

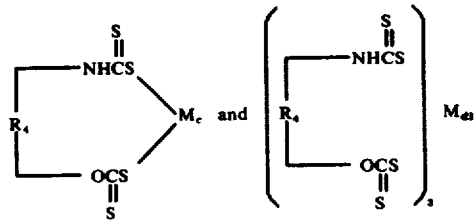

wherein $M_c$ is a divalent and $M_d$ is a trivalent metal atom and $R_4$ is a di-valent aliphatic radical; and B. an amine-isocyanate addition compound having the formula:

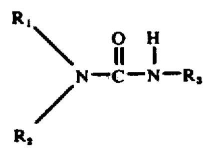

in which $R_1$ and $R_2$ are the same or different mono-valent hydrocarbon radicals having 1 to 8 carbon atoms; or together with the nitrogen atom, a non-acidic heterocyclic ring, containing at least one atom selected from oxygen, sulphur and nitrogen; and $R_3$ represents a substituted or unsubstituted aryl or alkyl radical having 4 to 18 carbon atoms.

2. A vulcanizable rubber composition comprising:

A. a rubber containing an olefinically unsaturated group;

B. at least one compound as a source of carbon disulfide selected from the group consisting of:

1. cyclic bis (dithiocarbamic acid) metal salts having the general formula:

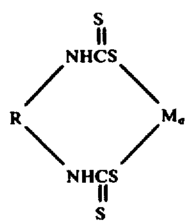

in which R represents a di-valent cycloaliphatic or aromatic radical and $M_a$ represents a di-valent metal atom, 2. non-cyclic dithiocarbamic-xanthogenic acid metal salts having the formula:

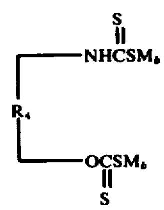

wherein $M_b$ is a mono-valent metal atom and $R_4$ is a di-valent aliphatic radical, and 3. cyclic dithiocarbamic-xanthogenic acid metal salts having the formulas:

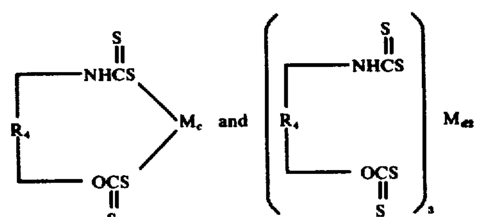

wherein $M_c$ is a divalent and $M_d$ is a trivalent metal atom and $R_4$ is a di-valent aliphatic radical; and C. an amine-isocyanate addition compound having the formula:

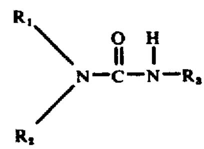

in which $R_1$ and $R_2$ are the same or different mono-valent hydrocarbon radicals having 1 to 8 carbon atoms; or together with the nitrogen atom, a non-acidic heterocyclic ring, containing at least one atom selected from oxygen, sulphur and nitrogen;

and $R_3$ represents a substituted or unsubstituted aryl or alkyl radical having 4 to 18 carbon atoms.

3. The rubber composition of claim 2 in which the rubber is selected from the group consisting of natural rubber, polyisoprene rubber, polybutadiene rubber, styrene-butadiene copolymer rubber, acrylonitrile-butadiene copolymer rubber, and ethylene-propylene-diene terpolymer rubber.

4. The rubber composition of claim 2 in which the amount of the amine-isocyanate addition compound (3) to the compound (2) is from 0.5 to 1 to 2 to 1 based on the moles of isolated amine to carbon disulfide.

5. The rubber composition of claim 2 in which the amount of compound (2) is from 0.1 to 8 parts by weight per 100 parts of the rubber (1).

6. The rubber composition of claim 5 in which the amount of compound (2) is from 0.5 to 2 parts by weight per 100 parts of the rubber (1).

7. The rubber composition of claim 2 in which the carbon disulfide source is zinc phenylene-1,2-bis-dithiocarbamate.

8. The rubber composition of claim 2 in which the carbon disulfide source is ferrous phenylene-1,2-bis-dithiocabamate.

9. The rubber composition of claim 2 in which the carbon disulfide source is nickel phenylene-1,2-bis-dithiocarbamate.

10. The rubber composition of claim 2 in which the carbon disulfide source is cobalt phenylene-1,2-bis-dithiocarbamate.

11. The rubber composition of claim 2 in which the carbon disulfide source is manganese phenylene-1,2-bis-dithiocarbamate.

12. The rubber composition of claim 2 in which the carbon disulfide source is zinc cyclohexyl-1,2-bis-dithiocarbamate.

13. The rubber composition of claim 2 in which the carbon disulfide source is zinc phenylene-1,3-bis-dithiocarbamate 14. The rubber composition of claim 2 in which the carbon disulfide source is zinc 1,2-xylylene-bis-dithiocarbamate.

15. The rubber composition of claim 2 in which the carbon disulfide source is zinc hydroxyphenyl-3,4-bis-dithiocarbamate.

16. The rubber composition of claim 2 in which the carbon disulfide source is zinc tolylene-3,4-bis-dithiocarbamate.

17. The rubber composition of claim 2 in which the carbon disulfide source is zinc naphthylene-1,2-bis-dithiocarbamate.

18. The rubber composition of claim 2 in which the carbon disulfide source is zinc tolylene-2,4-bis-dithiocarbamate.

19. The rubber composition of claim 2 in which the carbon disulfide source is zinc ethylene-1-dithiocarbamate-2-xanthogenate.

20. The rubber composition of claim 2 in which the carbon disulfide source is aluminum ethylene-1-dithiocarbamate-2-xanthogenate.

21. The rubber composition of claim 2 in which the carbon disulfide source is nickel ethylene-1-dithiocarbamate-2-xanthogenate.

22. The rubber composition of claim 2 in which the carbon disulfide source is barium ethylene-1-dithiocarbamate-2-xanthogenate.

23. The rubber composition of claim 2 in which the carbon disulfide source is ferric ethylene-1-dithiocarbamate-2-xanthogenate.

24. The rubber composition of claim 2 in which the carbon disulfide source is silver ethylene-1-dithiocarbamate-2-xanthogenate.

25. The rubber composition of claim 2 in which the carbon disulfide source is manganese ethylene-1-dithiocarbamate-2-xanthogenate.

* * * * *

UNITED STATES PATENT AND TRADEMARK OFFICE
CERTIFICATE OF CORRECTION

PATENT NO. : 4,026,878

DATED : May 31, 1977

INVENTOR(S) : KUNIO KAGEYAMA, ET AL

It is certified that error appears in the above-identified patent and that said Letters Patent are hereby corrected as shown below:

Claim 4, line 3, change "(3)" to --(C)-- and change "(2)" to --(B)--.

Claim 5, line 2, change "(2)" to --(B)-- and in line 3, change "(1)" to --(A)--.

Claim 6, line 2, change "(2)" to --(B)-- and in line 3, change "(1)" to --(A)--.

Signed and Sealed this

***Thirty-first* Day of *October 1978***

[SEAL]

*Attest:*

RUTH C. MASON
*Attesting Officer*

DONALD W. BANNER
*Commissioner of Patents and Trademarks*